9229X
A. Hall.
No Printed Specification Available
Straw Cutter.
Patented Nov. 7, 1835.
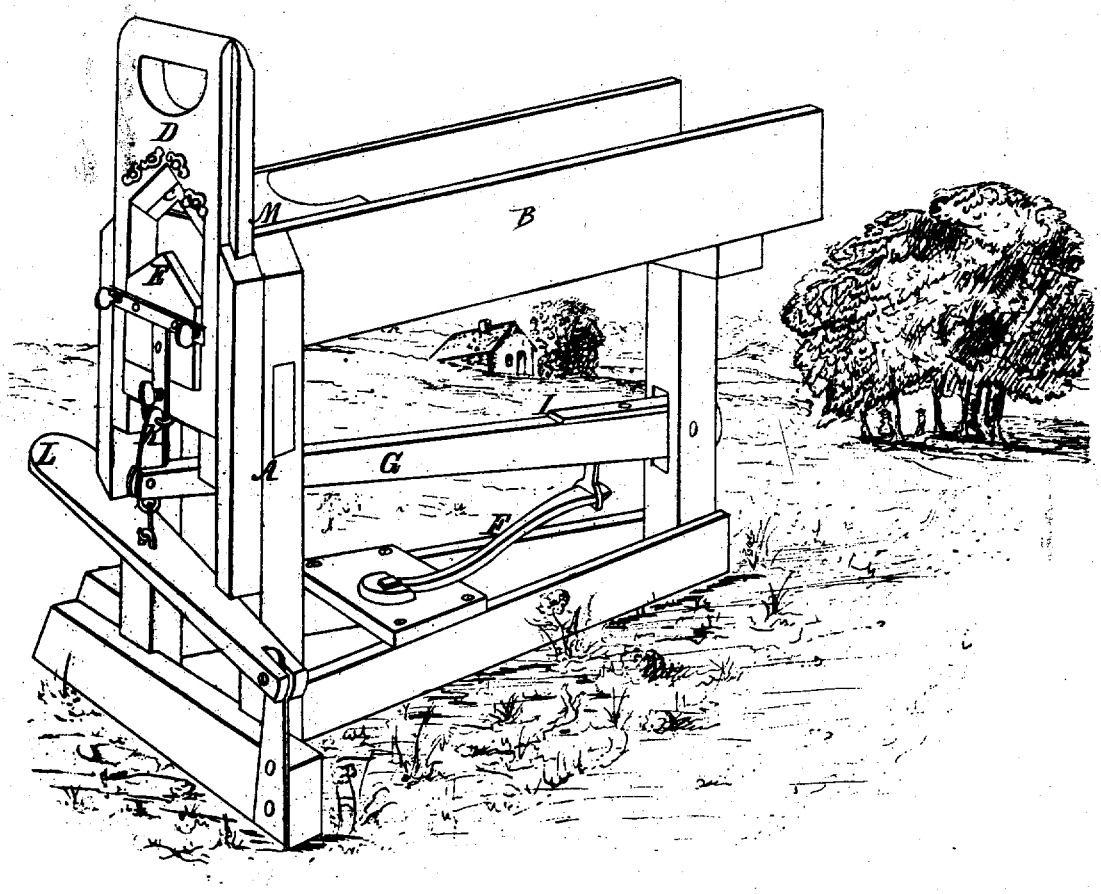

Ashman Hall of the Town of [illegible] - New York

Letters Patent

The Schedule referred to in these Letters Patent and making part of the same containing a description in the words of the said Ashman Hall himself of his improvement in the machine for cutting Straw Be it known that I, Ashman Hall of the Town of [illegible] in the County of [illegible] and State of New York have made an new and useful improvement in the machine for cutting Straw, which is described as follows, reference being had to the annexed Drawings making part of this specification.

The frame A and Box B of this Straw cutter are made similar to those in common use; my improvement consists in having a double knife C. placed angularly on the side of the sliding frame, or gate D. which is towards the cutting Box: and secured by screws or rivets or the knife may be made of a single piece of steel shaped so as to have its two cutting edges in an angular position in opposite directions in order that the cutting shall be performed towards the centre of the box instead of the side; and that the operation of the knives shall have a tendency to press the substance to be cut into a more compact body whilst being cut. Also in having a gauge or regulator E. attached to the gate and regulated or guaged by screws to determine the length of the straw to be cut: Likewise in having a strong spring F secured by one end to the lower part of the frame, its other end connected to a lever G. by a small rod H. secured to the lever by an Iron plate I fastened on the top of the lever to which lever the Gate or sliding frame is attached by a pitman Rod K the spring being for the purpose of raising the gate and knives suddenly when a cut has been made. A treadle L to be operated by the foot is to be attached to the end of the lever. At the end of the cutting box near the knives is placed in an angular position a guard M made of iron or wood riveted on the inside of the box The operator having placed the straw or hay in the Box brings

9229 X ed forward against the guage with one hand whilst the other han-
[illegible] hold of the lever of the gate one foot rests on the platform
the other being on the end of the treadle which drives down the
lever gate until it meets and the straw is cut. the foot is then rais-
ed and the spring raises the lever and gate and the straw is
brought forward and another cut is made, and in this manner the
operation is continued.

"What I claim as my invention is the formation of the doub-
le knifes arrangement of the guage and the mode of apply
ing the spring as before described Engd. [illegible]

Witnesses
N. B. Gilbert
B. Bliss

Ashman Hall (Copy)

(520 Words)